(12) United States Patent
Prentice

(10) Patent No.: US 9,519,602 B2
(45) Date of Patent: Dec. 13, 2016

(54) AUDIO JACK SYSTEM

(71) Applicant: Fairchild Semiconductor Corporation, San Jose, CA (US)

(72) Inventor: Seth M. Prentice, Auburn, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 24 days.

(21) Appl. No.: 14/453,109

(22) Filed: Aug. 6, 2014

(65) Prior Publication Data

US 2015/0043757 A1    Feb. 12, 2015

Related U.S. Application Data

(60) Provisional application No. 61/862,569, filed on Aug. 6, 2013.

(51) Int. Cl.
*H04M 1/725* (2006.01)
*G06F 13/362* (2006.01)
*H04M 1/60* (2006.01)

(52) U.S. Cl.
CPC ........ *G06F 13/362* (2013.01); *H04M 1/72527* (2013.01); *H04M 1/6058* (2013.01)

(58) Field of Classification Search
CPC ... H04M 1/6058; H04M 1/72527; H04R 3/00; H04R 5/04; H04R 1/1041; G06F 13/362
See application file for complete search history.

(56) References Cited

U.S. PATENT DOCUMENTS

| 5,656,962 | A * | 8/1997 | Banik | H03K 3/0372 |
| | | | | 327/202 |
| 8,019,096 | B2 | 9/2011 | Sander et al. | |
| 8,254,592 | B2 | 8/2012 | Sander et al. | |
| 2007/0147640 | A1* | 6/2007 | Mottier | H04R 1/1041 |
| | | | | 381/111 |
| 2007/0256126 | A1* | 11/2007 | Erickson | G06F 21/34 |
| | | | | 726/20 |

(Continued)

FOREIGN PATENT DOCUMENTS

KR   101374074 B1   3/2014

OTHER PUBLICATIONS

Chinese Application Serial No. 201420441716.0, Office Action mailed Oct. 22, 2014, w/English Translation, 3 pgs.

(Continued)

*Primary Examiner* — Fan Tsang
*Assistant Examiner* — Angelica M McKinney
(74) *Attorney, Agent, or Firm* — Schwegman Lundberg & Woessner, P.A.

(57) ABSTRACT

This application discusses a system that can include a master device and a slave device coupled to the master device via an audio jack connector. In an example, the master device and the slave device can be configured to exchange information via a single conductive path of the audio jack connector using a digital communication protocol. The single conductive path can be configured to conduct audio signals of an audio transducer and the slave device can include a depletion-mode transistor to complete a circuit including the audio transducer and the single conductive path in a first state, and to isolate the audio transducer from the single conductive path in a second state.

17 Claims, 6 Drawing Sheets

(56) References Cited

U.S. PATENT DOCUMENTS

| | | | | |
|---|---|---|---|---|
| 2008/0044004 | A1* | 2/2008 | Keehr | H04W 52/028 |
| | | | | 379/431 |
| 2009/0180643 | A1* | 7/2009 | Sander et al. | 381/111 |
| 2010/0215183 | A1* | 8/2010 | Hansson | H04R 1/1033 |
| | | | | 381/58 |
| 2011/0163604 | A1* | 7/2011 | Hong | H02J 9/061 |
| | | | | 307/66 |
| 2012/0014530 | A1* | 1/2012 | Yamkovoy | H04M 1/6066 |
| | | | | 381/58 |
| 2012/0163634 | A1* | 6/2012 | Wu et al. | 381/111 |
| 2012/0183160 | A1* | 7/2012 | Abe et al. | 381/123 |
| 2013/0003995 | A1* | 1/2013 | Poulsen | H03F 1/0272 |
| | | | | 381/121 |
| 2013/0329916 | A1* | 12/2013 | Breece et al. | 381/122 |
| 2013/0336506 | A1* | 12/2013 | Prentice | H04R 3/00 |
| | | | | 381/309 |
| 2013/0343561 | A1* | 12/2013 | Johnson et al. | 381/74 |
| 2014/0055167 | A1* | 2/2014 | Oh | G01R 31/024 |
| | | | | 327/63 |
| 2015/0296286 | A1 | 10/2015 | Prentice | |

OTHER PUBLICATIONS

Chinese Application Serial No. 201420441716.0, Response filed Oct. 24, 2014 to Office Action mailed Oct. 22, 2014, w/English Claims, 33 pgs.

U.S. Appl. No. 14/639,629, filed Mar. 5, 2015, Audio Accessory Communication With Active Noise Cancellation.

* cited by examiner

AUDIO JACK SYSTEM

CLAIM OF PRIORITY

The application claims the benefit of priority under 35 U.S.C. §119(e) to Prentice, U.S. Provisional Patent Application No. 61/862,569, filed on Aug. 6, 2013, which is hereby incorporated by reference in its entirety.

BACKGROUND

The introduction of the transistor radio in some sense can be the birth of the portable electronic industry. Since that time, the advances in electronics have led to more advanced portable electronic devices. One aspect of portable electronics that seems to have been constant over the course of the history, including the transistor radio, is the audio jack connector. Over that history, the audio jack connector extended the functionality of the transistor radio and later portable electronic devices by allowing a user to hear audio from the device without disrupting others such as by using ear buds or headphones connected to the portable electronic device via the audio jack.

OVERVIEW

This application discusses a system that can include a master device and a slave device coupled to the master device via an audio jack connector. In an example, the master device and the slave device can be configured to exchange information via a single conductive path of the audio jack connector using a digital communication protocol. The single conductive path can be configured to conduct audio signals of an audio transducer and the slave device can include a depletion-mode transistor to complete a circuit including the audio transducer and the single conductive path in a first state, and to isolate the audio transducer from the single conductive path in a second state.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventor has recognized a system that can extend the functionality of audio jack equipped electronic devices by extending the functional aspects of the audio jack connector beyond conducting audio signals between a master device such as a portable electronic device and a slave device such as a set of ear buds.

Figure 1:
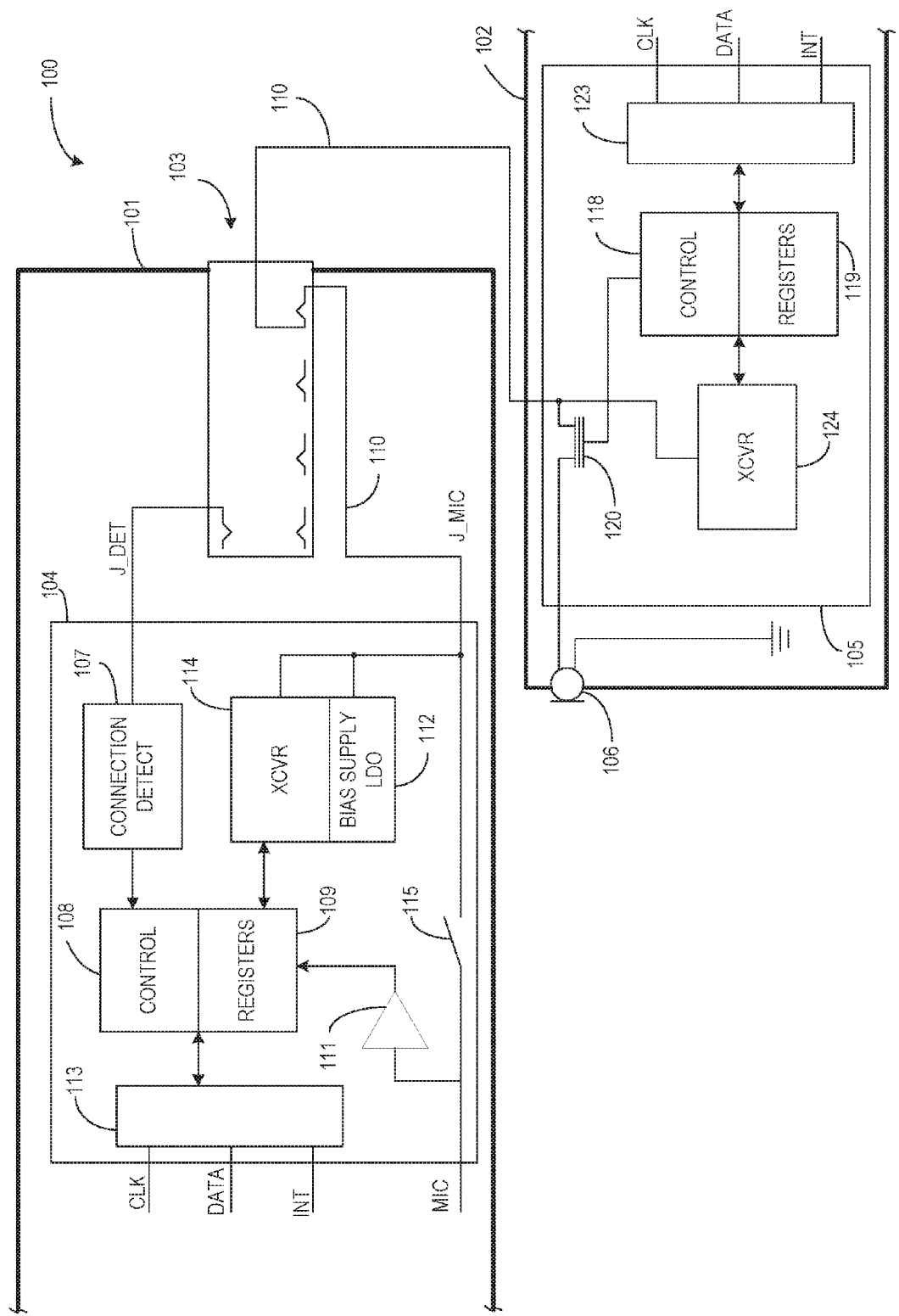
FIG. 1 illustrates generally an example system including a master device and a slave device.

FIG. 1 illustrates generally an example system including a master device 101 and a slave device 102. In certain examples, the master device can be a portable electronic device such as a portable media player, a cell phone, a smartphone, a personal digital assistant, or a combination thereof that includes a mate-able portion of an audio connector such as a mate-able portion of an audio jack connector 103. In certain examples, each device 101, 102, can include an audio connector interface circuit 104, 105. The master audio connector interface circuit 104 can couple to and communicate with other components of the master device 101, such as a baseband processor, an audio processor, or combinations thereof. The slave audio connector interface circuit 105 can couple to and communicate with other components of the slave device 102 such as one more audio transducers, including for example, a speaker (not shown) or a microphone 106. For clarity, the illustrated examples show only certain conductors associated with the audio connector. It is understood that the audio connector such as an audio jack connector 103 can include addition conductors, for example, for a ground and for conducting audio signals from the master device 101 to audio output transducers of the slave device 102.

In certain examples, the master audio connector interface circuit 104 can include a connection detection circuit 107, a controller or control logic 108 including registers 109, a conductive path for conveying a microphone signal, microphone key-press logic 111, a bias source 112, a multi-master, multi-slave, single-ended, serial computer bus interface 113 and a master transceiver 114.

The connection detection circuit 107 can receive connection information from one or more pins of an audio connector, such as a dedicated connection pin (J-DET) of an audio jack connector 103. In certain examples, the connection detection circuit 107 can receive connection information from other pins of the audio connector in addition to the dedicated connection pin (J_DET). In some examples, the connection detection circuit 107 can detect coupling and decoupling of an accessory or slave device 102 with the portion of audio jack connector 103 of the master device 101 and can provide the controller or control logic 108 of the master audio connector interface circuit 104 with an indication of each connection and disconnection event. In some examples, the connection detection circuit 107 can debounce connection and disconnection events to assure that an indication is provided only when a slave device 102 has fully connected with the master device 101 or has fully disconnected from the master device 101 and thus eliminate false indications. In some examples, the connection detection circuit 107 can detect anomalies with an audio jack connector 103 such as when moisture is present in the connection and can provide a corresponding indication to the controller or control logic 108 of the master audio connector interface circuit 104.

In certain examples, the controller or control logic 108 can control the operation and exchange of information between components of the master audio connector interface circuit 104, or between the master audio connector interface circuit 104 and other components of the master device 101. In certain examples, the master audio connector interface circuit 104 can include memory or registers 109 to store instructions and parameters for operating the master audio connector interface circuit 104 and for interfacing with connected accessories or slave devices 102. In some examples, the controller or control logic 108 can monitor one or more voltage levels of the single conductive path 110. In certain examples, the single conductive path 110 can be referenced to a ground potential of either the master device 101 or the slave device 102. In response to a first voltage level, the controller or control logic 108 can provide microphone audio to the master device 101 using the single conductive path 110. In certain examples, the controller or control logic 108 can control coupling and uncoupling the single conductive path 110 to provide the microphone audio to the master device 101. In some examples, in response to second voltage level, the controller or control logic of the master device 101 can control decoupling the single conductive path 110 from an audio input of the baseband processor to allow digital communications between the master device 101 and the slave device 102 using the single conductive path 110. In certain examples, the second voltage level can be a result of the master device 101 using a bypass switch to bypass a bias resistor coupled to the single conductive path 110.

In certain examples, the master audio connector interface circuit 104 can include a single conductive path 110 for receiving audio information from a slave device microphone 106 for example and providing the audio information to a baseband processor or audio processor of the master device 101. In certain examples, the key press logic 111 can be selectively coupled to the single conductive path 110 to detect a key-press action from a key or switch of the slave device 102 that shares a conductor with the slave microphone 106. In some examples, the single conductive path 110 can also be used to carry digital communication signals between a master transceiver 114 of the master audio connector interface circuit 104 and a connected slave device 102. In certain examples, the master audio connector interface circuit 104 can include a microphone switch 115 or transistor to isolate the single conductive path 110 from the baseband processor or audio processor in preparation for exchange of digital communication information between the master device 101 and a connected slave device 102 using the single conductive path 110.

The bias source 112 can provide a voltage bias for a microphone 106 of the slave device 102. In certain examples, the bias source 112 can include a low drop-out power supply or voltage regulator. In some examples, the bias source 112 can be part of a master transceiver 114 of the master audio connector interface circuit 104. The master transceiver 114 can use the single conductive path 110 to exchange digital communication information between the master device 101 and a connected slave device 102. In certain examples, since only a single conductive path 110 is used for the digital communications, other conductive paths of the audio connector can simultaneously be used to exchange other information between the master device 101 and the connected slave device 102. For example, the other conductive paths can be used to transmit audio signals from the master device 101 for broadcast from speakers of the slave device 102 while the single conductive path 110 is being used for digital communications between the master device 101 and the slave device 102.

The master multi-master, multi-slave, single-ended, serial computer bus interface 113, such as an I2C interface, can enable digital communications between the master audio connector interface circuit 104 and other chip components of the master device 101. In certain examples, the controller or control logic 108 can coordinate the master audio connector interface circuit 104 with the master multi-master, multi-slave, single-ended, serial computer bus interface 113 to form a multi-master, multi-slave, single-ended, serial bridge with a connected slave device 102.

In certain examples, the slave audio connector interface circuit 105 can include a second portion of the single conductive path 110, a slave controller or slave control logic 118 and corresponding registers 119, a slave transceiver 124, and a slave, multi-master, multi-slave, single-ended, serial computer bus interface 123. The single conductive path 110 can be used for receiving audio information from the slave device microphone 106 for example and providing the audio information to the master device 101.

In certain examples, the slave controller or slave control logic 118 can control the operation and exchange of information between components of the slave audio connector interface circuit 105 and between the slave audio connector interface circuit 105 and other components of the slave device 102. In certain examples, the slave audio connector interface circuit 105 can include memory or registers 119 to store instructions and parameters for operating the slave audio connector interface circuit 105 and for interfacing with connected master devices.

The slave transceiver 124 can use the single conductive path 110 to exchange digital communication information between the slave device 102 and the master device 101. In certain examples, since only a single conductive path 110 is used for the digital communications, other conductive paths of the audio connector can simultaneously be used to exchange other information between the slave device 102 and the master device 101. For example, the other conductive paths can be used to transmit audio signals from the master device 101 for broadcast from speakers (not shown) of the slave device 102 while the single conductive path 110 is being used for digital communications between the master device 101 and the slave device 102.

In certain examples, the slave audio connector interface circuit 105 can include a switch 120 for coupling the single conductive path 110 with the microphone 106 in a first state and for isolating the microphone 106 from the single conductive path 110 in a second state to allow for digital communications using the single conductive path 110. In certain examples, the switch 120 can include a transistor. In some examples, the switch 120 can include a depletion-mode transistor. A depletion-mode transistor can provides the benefit of a default unpowered, low-impedance state that can couple the microphone 106 to the single conductive path 110, thus, allowing the slave device 102 to at least provide microphone-sourced audio information if the slave device 102 does not have power. As such, the switch can provide ultra-low power operation of a microphone equipped slave device 102.

The slave, multi-master, multi-slave, single-ended, serial computer bus interface 123, such as an I2C interface, can enable digital communications between the slave audio connector interface circuit 105 and other chip components of the slave device 102. In certain examples, the slave controller or slave control logic 118 can coordinate the slave audio connector interface circuit 105 with the slave, multi-master, multi-slave, single-ended, serial computer bus interface 123 to form a multi-master, multi-slave, single-ended, serial bridge with a connected master device 101. In certain examples, the master device can include circuitry to prevent pop and click sounds from being presented to the user. In some examples, the master controller 108 can modulate the control node of at least one of the microphone transistor 115 or a bypass transistor (not shown) to eliminate audio pop from audio signal received at the audio processor. Such sounds can be generated when an accessory or slave device is attached or detached from the master device. Pop and click sounds can also be generated when a microphone is attached or a microphone bias is suddenly applied to a microphone conductor.

The slave device 102 may be considered an advanced slave device. Such a device can provide read and write functionality to the master device 101 that can include serial communication of key-press events and sophisticated accessory identification and parameter options. In certain examples, the slave device can include multiple fuses for high-level programmable accessory identification.

Figure 2:
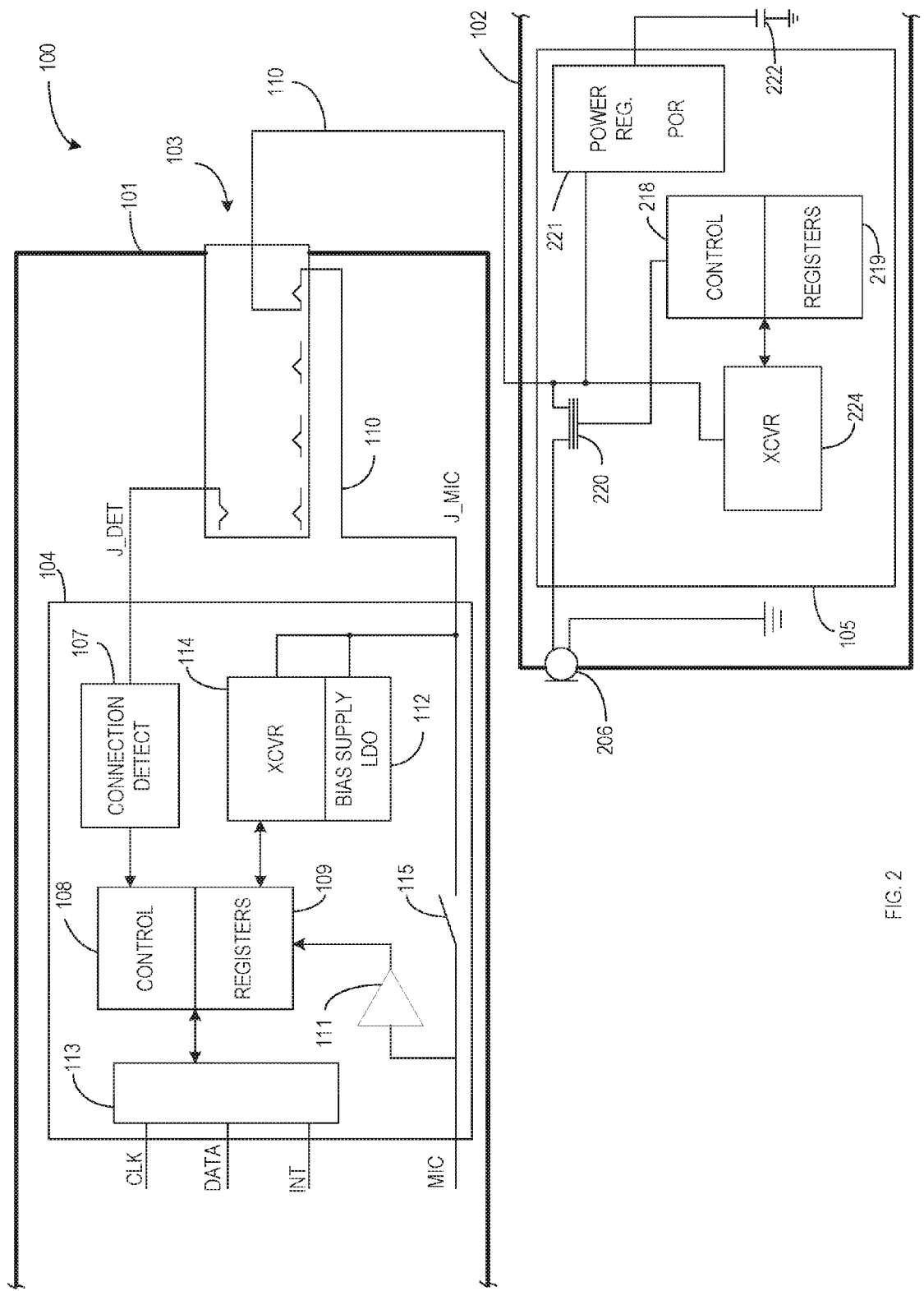
FIG. 2 illustrates generally an example system including a master device and a second example slave device.

FIG. 2 illustrates generally an example system including a master device 101 and a second example slave device 202. In certain examples, the master device 101 can be a portable electronic device such as a portable media player, a cell phone, a smartphone, a personal digital assistant, or a combination thereof that includes a mate-able portion of an audio connector such as a mate-able portion of an audio jack connector 103. In certain examples, each device 101, 202, can include an audio connector interface circuit 104, 205. The master audio connector interface circuit 104 can couple to and communicate with other components of the master device 101, such as a baseband processor, an audio processor, or combinations thereof. The slave audio connector interface circuit 205 can couple to and communicate with other components of the slave device 202 such as one more audio transducers, including for example, a speaker (not shown) or a microphone 206. For clarity, the illustrated examples show only certain conductors associated with the audio connector. It is understood that the audio connector such as an audio jack connector 103 can include addition conductors, for example, for a ground and for conducting audio signals from the master device 101 to audio output transducers of the slave device 202.

The second example slave device 202 can include a second example slave audio connector interface circuit 205. In certain examples, the slave audio connector interface circuit 205 can include a second portion of the single conductive path 110, a slave controller or slave control logic 218 and corresponding registers 219, a slave transceiver 224, and a power regulation circuit 221. The single conductive path 110 can be used for receiving audio information from the slave device microphone 206 for example and providing the audio information to the master device 101.

In certain examples, the slave controller or control logic 218 can control the operation and exchange of information between components of the slave audio connector interface circuit 205 and between the slave audio connector interface circuit 205 and other components of the slave device 202. In certain examples, the slave audio connector interface circuit 205 can include memory or registers 219 to store instructions and parameters for operating the slave audio connector interface circuit 205 and for interfacing with connected master devices.

The slave transceiver 224 can use the single conductive path 110 to exchange digital communication information between the slave device 202 and the master device 101. In certain examples, since only a single conductive path 110 is used for the digital communications, other conductive paths of the audio connector can simultaneously be used to exchange other information between the slave device 202 and the master device 101. For example, the other conductive paths can be used to transmit audio signals from the master device 101 for broadcast from speakers (not shown) of the slave device 202 while the single conductive path 110 is used for digital communications between the master device 101 and the slave device 202.

In certain examples, the slave audio connector interface circuit 205 can include a switch 220 for coupling the single conductive path 110 with the microphone 206 in a first state and for isolating the microphone 206 from the single conductive path 110 in a second state to allow for digital communications using the single conductive path 110. In certain examples, the switch 220 can include a transistor. In some examples, the switch 220 can include a depletion-mode transistor. A depletion-mode transistor can provides the benefit of a default unpowered, low-impedance state of the switch 220 that can couple the microphone 206 to the single conductive path 110, thus, allowing the slave device 202 to at least provide microphone-sourced audio information if the slave device 202 does not have power. As such, the switch can provide ultra-low power operation of a microphone equipped slave device 202.

In certain examples, the power regulation circuit 221 can receive a microphone bias from the master device 101 or a high logic level digital signal and can harvest electrical charge to power the slave device 202. In certain examples, the harvested charge can be stored on a capacitor 222 of the slave device 202. In certain examples, the power regulation circuit 221 can include a power-on reset circuit to enable certain slave circuitry only when the voltage across the capacitor 222, or the voltage available to power the circuits, has reached a predetermined voltage threshold.

The slave device 202 may be considered a simple slave device. Such a device can provide write its device identification to the master device 101. The simple slave can receive device power from the master device 101. In certain examples, the slave device can include multiple hard wired inputs (bits) for high-level accessory identification.

Figure 3:
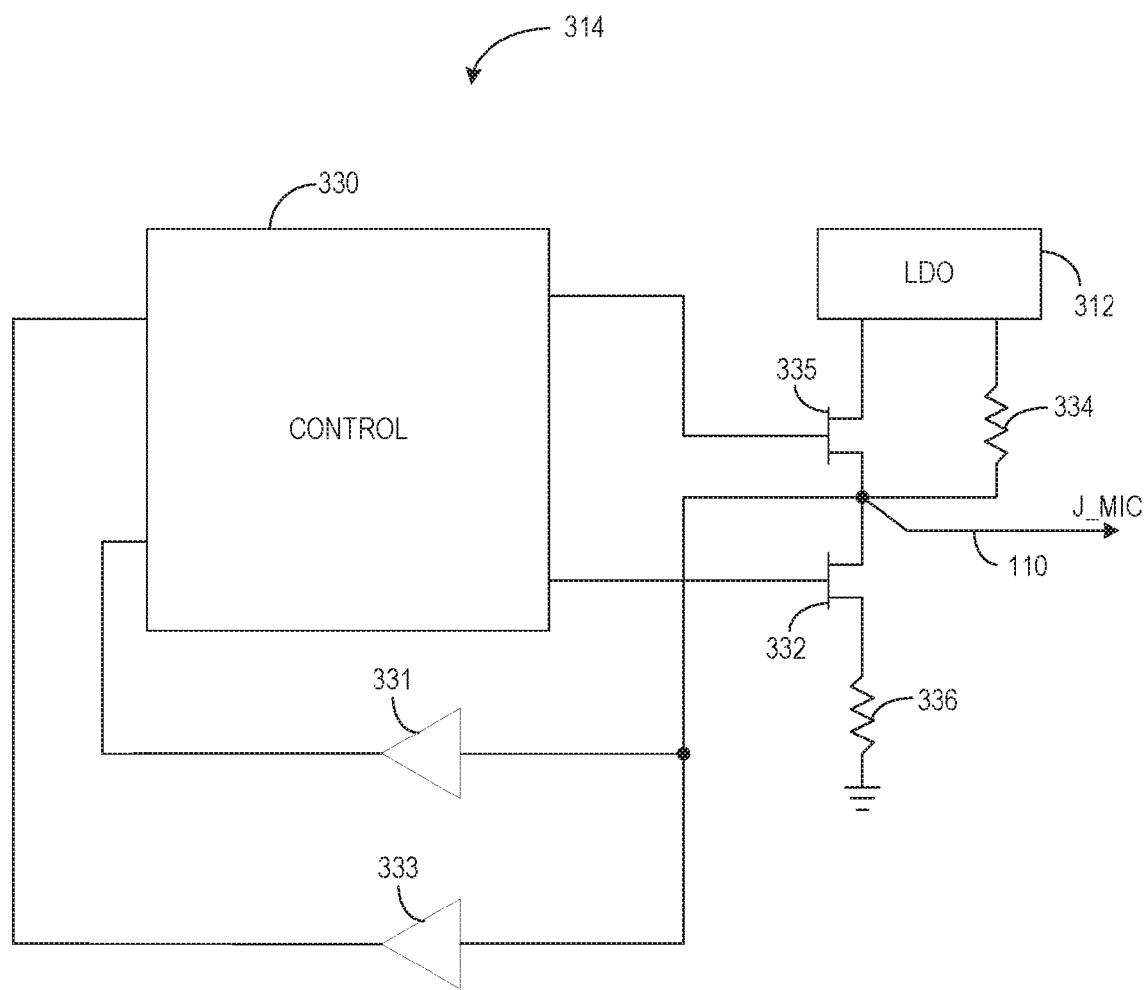
FIG. 3 illustrates generally an example master transceiver for a master device such as the example master devices shown in FIGS. 1 and 2.

FIG. 3 illustrates generally an example master transceiver 314 for a master device such as the example master devices shown in FIGS. 1 and 2. In certain examples, the master transceiver 314 can include a controller 330, a receive buffer 331, a transmit switch 332, a bias voltage detector 333, a bias source 312, a bias resistor 334, a bypass transistor 335, and a pull-down resistor 336.

In certain examples, the controller 330 can monitor several inputs and control the bypass transistor 335 and the transmit switch 332. For example, if no digital communications are being exchanged or requested, the controller 330 can maintain the bypass transistor 335 in a high impedance state allowing the bias source 312 and the bias resistor 334 to bias a microphone in a slave device using a single conductive path 110. In certain examples, the controller 330 can prepare for master-initiated digital communications by placing the bypass transistor 335 in a low-impedance state that bypasses the bias resistor 334 and pulls the voltage level of the single conductive path 110 towards the output voltage of the bias source 312. In certain examples, the bypass transistor 335 can couple a voltage supply, such as the bias source 312 or another voltage source, directly to the single conductive path 110 in the low-impedance state. In some examples, after the voltage level of the single conductive path 110 reaches a first predetermined threshold as detected by the bias voltage detector 333, the controller can transmit digital communication using the transmit switch 332 and pull-down resistor 336, and can receive digital communication information from a slave device using the receive buffer 331. In some examples, the bias voltage detector 333 can detect a slave device initiating digital communications such as by detecting the voltage of the single conductive path 110 at or near a second threshold. The second threshold voltage can be indicative of the slave device disconnecting the slave microphone from the single conductive path 110.

Figure 4:
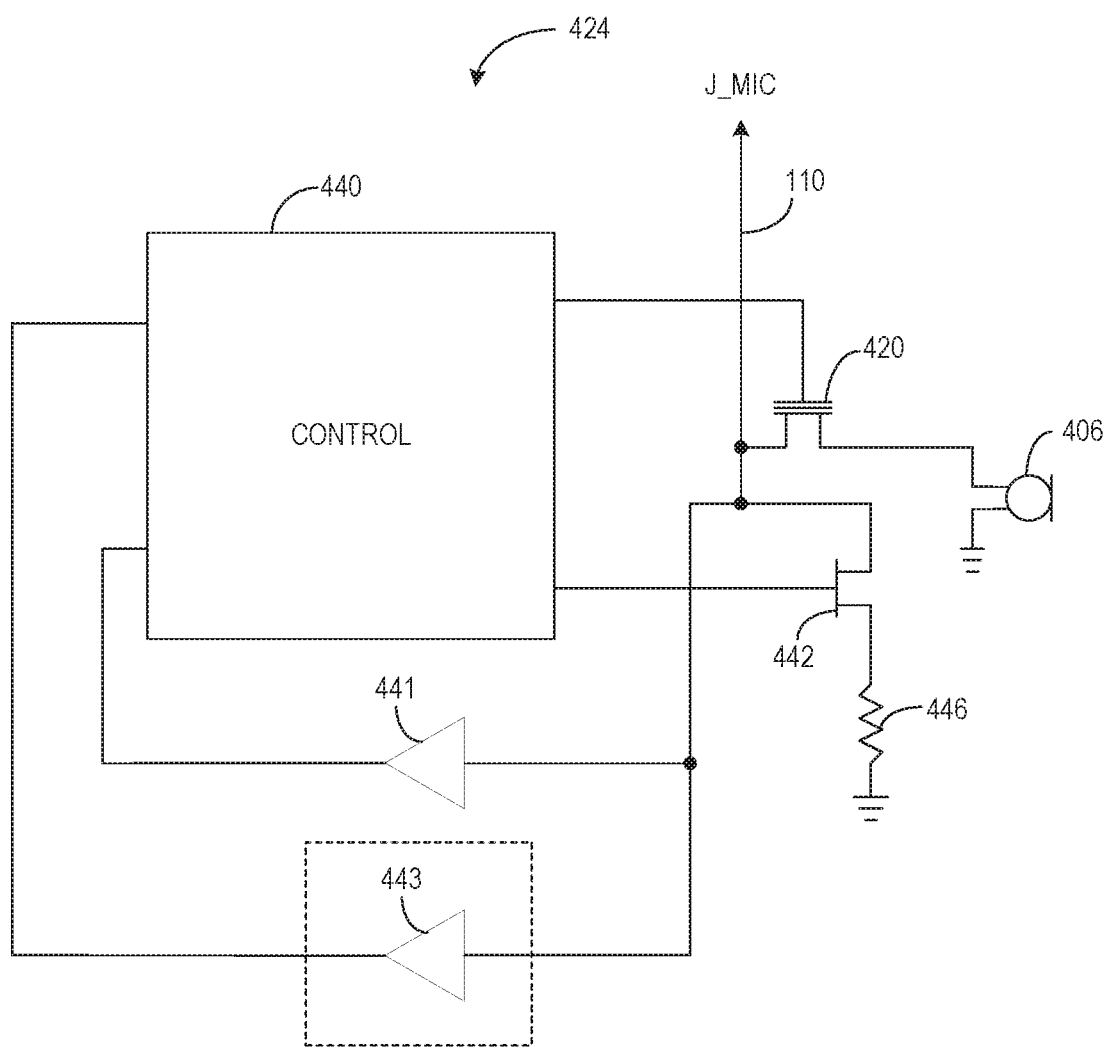
FIG. 4 illustrates generally an example slave transceiver for a slave device such as for the example slave devices shown in FIGS. 1 and 2.

FIG. 4 illustrates generally an example slave transceiver 424 for a slave device such as for the example slave devices shown in FIGS. 1 and 2. In certain examples, the slave transceiver 424 can include a controller 440, a receive buffer 441, a transmit switch 442, an optional bias voltage detector 443, an isolation transistor 420, and a pull-down resistor 446.

In certain examples, the controller 440 can monitor several inputs and control the isolation transistor 420 and the transmit switch 442. For example, if no digital communications are being exchanged or requested, the controller 440 can maintain the isolation transistor 420 in a low impedance state allowing a slave microphone to receive a bias voltage and provide audio signals to a master device using a single conductive path 110. In certain examples, the controller 440 can prepare for slave-initiated digital communications by placing the isolation transistor 420 in a high-impedance state that isolates the slave microphone from the single conductive path 110. In some examples, after the voltage level of the single conductive path 110 reaches a first predetermined threshold as detected by the optional bias voltage detector 443, the slave controller 440 can transmit digital communication using the transmit switch 442 and pull-down resistor 446, and can receive digital communication information from the master device using the receive buffer 441. In some examples, the optional bias voltage detector 443 can detect a master device initiating digital communications such as by detecting the voltage of the single conductive path 110 at or near a second threshold. The second threshold voltage can be indicative of the master device bypassing a bias resistor and allowing the voltage of the single conductive path to be pulled to the output voltage of the bias source. In certain examples, the isolation transistor can include a depletion-mode transistor. A depletion-mode transistor can provide the benefit of a default unpowered, low-impedance state of the isolation transistor 420 that can couple the microphone 406 to the single conductive path 110, thus, allowing the slave device to at least provide microphone-sourced audio information if the slave device does not have power.

Figure 5:
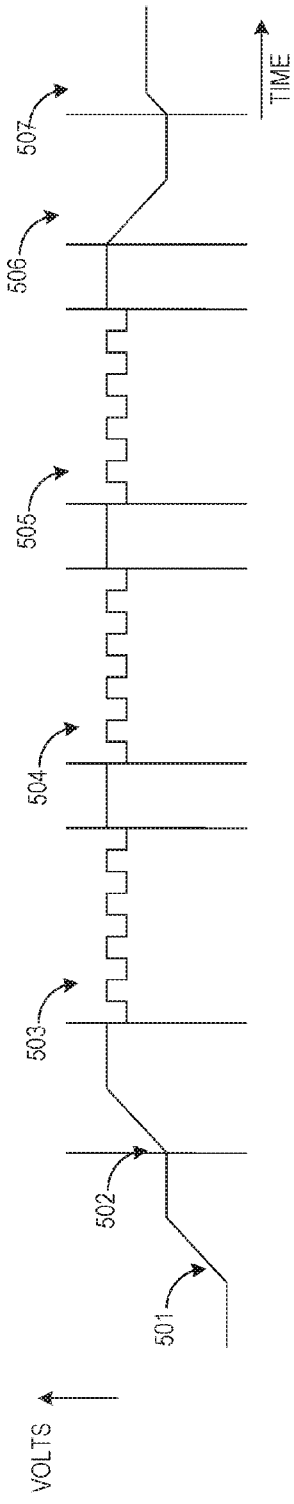
FIGS. 5-7 illustrate generally voltage levels of the conductive path around a digital communication event of an example system.
Figure 6:
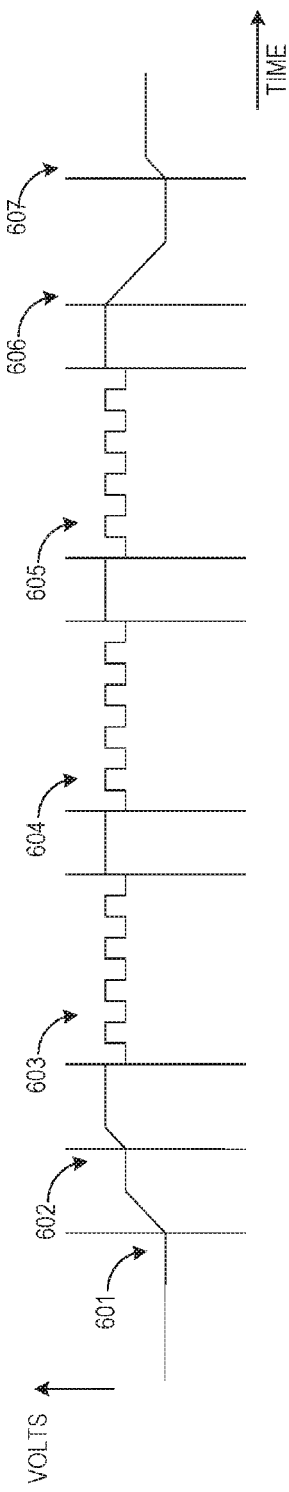
Figure 7:
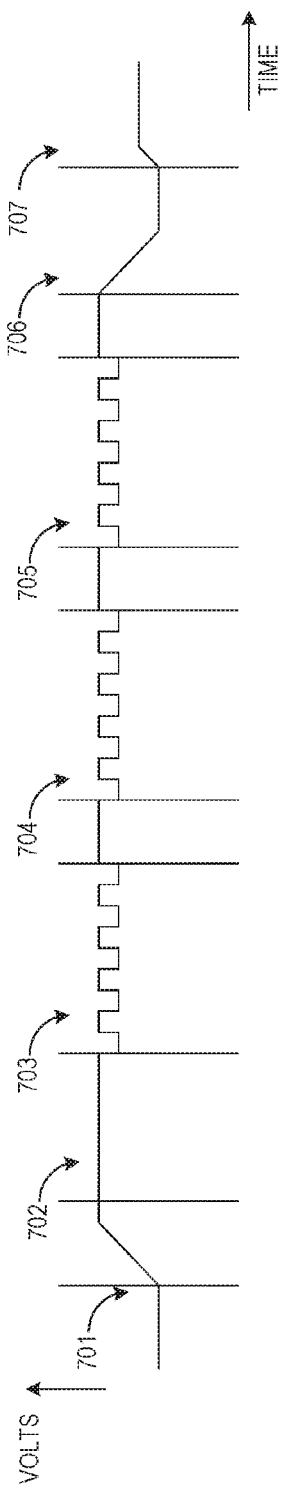

FIGS. 5-7 illustrate generally voltage levels of the conductive path around a digital communication event of an example system. FIG. 5 illustrates generally an authentication communication event. At 501, the master device bypasses the bias resistor. In certain examples, the master device can also isolate the single conductive path from the baseband process or an audio processor, for example, by using a microphone switch (see FIG. 1, 115). At 502, the slave can isolate the slave microphone from the single conductive path, for example, by using an isolation switch (see FIG. 1, 120, FIG. 2, 220, or FIG. 4, 420), if the microphone is not already isolated from the single conductive path. In certain examples, the slave can detect a change in the voltage on the single conductive path using an optional bias voltage detection circuit (see FIG. 4, 443). At 503, the master device can detect the voltage on the single conductive path has reached a threshold and can transit a verification code to the slave device over the single conductive path. At 504, after a first predetermined minimum delay, the slave device can transmit an identification (ID) code to the master device over the single conductive path. At 505, after a second predetermined minimum delay, the master device can transmit a power down code code to the slave device over the single conductive path. At 506, after a third predetermined minimum delay, the slave device can couple the microphone to the single conductive path. At 507, after detecting the connected microphone via the voltage on the single conductive path, the master device can couple the single conductive path to the baseband processor or an audio processor, and can disable a bypass transistor to couple the bias source to the single conductive path through the bias resistor.

FIG. 6 illustrates generally a slave-initiated communication using the single conductive path. Such a communication can occur when a parameter in the master is updated by the slave device, when the slave device requests an update from the master device, when the slave device communicates an event to the master device, such as a key-press event, or combinations thereof. At 601, the slave device can isolate the slave microphone from the single conductive path, at 602, the master device can detect a change in voltage level resulting from the isolation of the slave microphone and can isolate the single conductive path from the baseband processor or audio processor and can use a bypass transistor to bypass a microphone bias resistor. At 603, after a detecting the voltage on the first conductive path satisfy a predetermined threshold, the master can transmit a verification code. At 604, after a first minimum delay, the slave can transmit the event information to the master. At 605, after a second minimum delay, the master can transmit a power down code. At 606, after a third predetermined minimum delay, the slave device can couple the microphone to the single conductive path. At 607, after detecting the connected microphone via the voltage on the single conductive path, the master device can couple the single conductive path to the baseband processor or an audio processor, and can disable a bypass transistor to couple the bias source to the single conductive path through the bias resistor.

FIG. 7 illustrates generally a master initiated write communication event. At 701, the master device can bypass the bias resistor using a bypass transistor. In certain examples, the master device can also isolate the single conductive path from the baseband process or an audio processor, for example, by using a microphone switch. At 702, the slave can isolate the slave microphone from the single conductive path, for example, by using an isolation switch, if the microphone is not already isolated from the single conductive path. In certain examples, the slave can detect a change in the voltage on the single conductive path that results from the master device bypassing the bias resistor using an optional bias voltage detection circuit. At 703, the master device can detect the voltage on the single conductive path has reached a threshold and can transmit a write code to the slave device over the single conductive path. At 704, after a first predetermined minimum delay, the slave device can transmit an acknowledgment to the master device over the single conductive path. At 705, after a second predetermined minimum delay, the master device can transmit write data to the slave device over the single conductive path. At 706, after a third predetermined minimum delay, the slave device can couple the microphone to the single conductive path. At 707, after detecting the connected microphone via the voltage on the single conductive path, the master device can couple the single conductive path to the baseband processor or an audio processor, and can disable a bypass transistor to couple the bias source to the single conductive path through the bias resistor.

In certain examples, the half-duplex communication protocol can include a transmission frequency of between 200 kilohertz (kHz) to about 400 kHz. In some examples, each bit includes both high and low logic levels. For example, a "1" bit can include a long high logic level with a short low logic level during a bit cycle. Likewise, a "0" bit can be received with a bit cycle including a long low logic level and a short high logic level. In certain examples, communication information can be packetized and each packet can include an address, data, one or more parity bits and one or more reserved bits.

Figure 8:
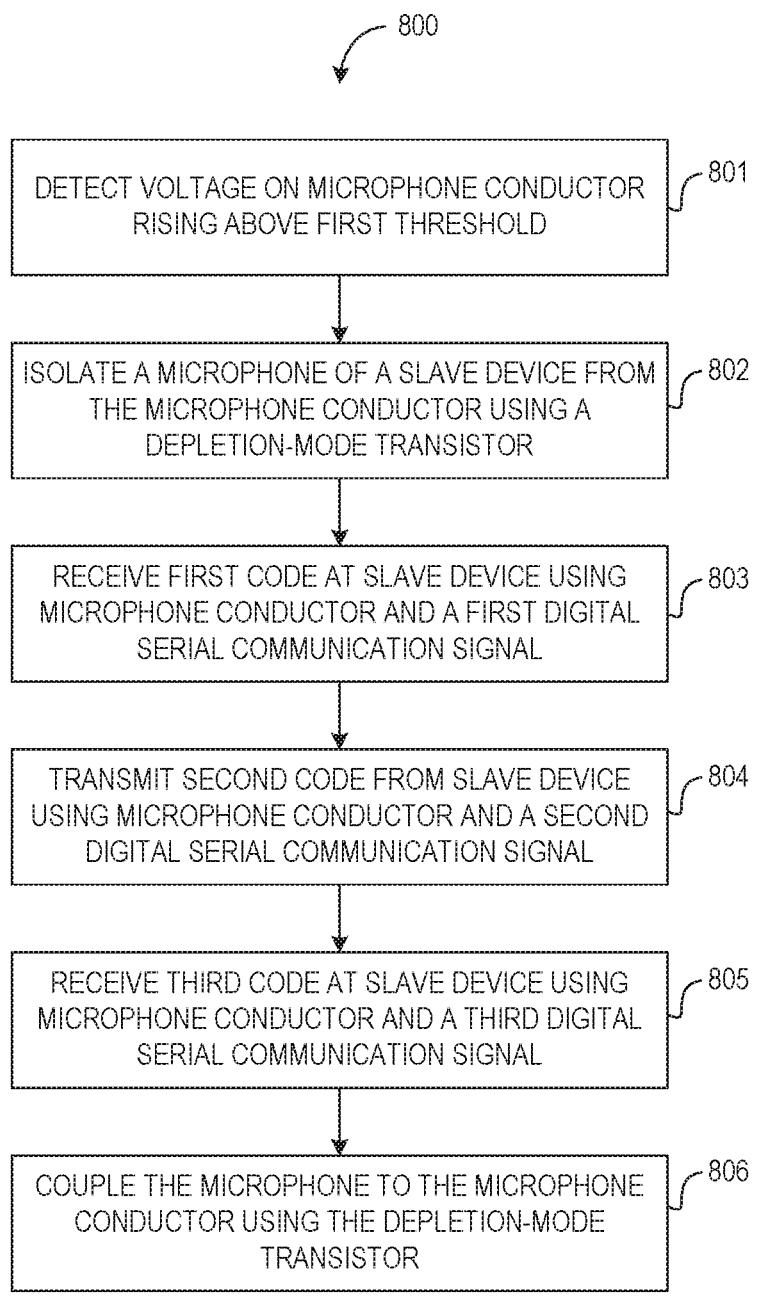
FIG. 8 illustrates generally a flowchart of an example method for digital communication between a master device and a slave device.

FIG. 8 illustrates generally a flowchart of an example method for digital communication between a master device and a slave device. At 801, a voltage can be detected on a microphone conductor that is above a first threshold at the slave device, the voltage indicating the master device is capable of and is ready for digital communication using the microphone conductor. At 802, a microphone of the slave device can be isolated from the microphone conductor using a depletion-mode transistor of the slave device. At 804, a first code can be received at the slave device using the microphone conductor and a first digital serial communication signal. At 805, a second code can be transmitted from the slave device using the microphone conductor and a second digital communication signal. At 805, a third code can be received at the slave device using the microphone conductor and a third digital serial communication signal. At 806, the microphone can be coupled to the microphone conductor using the depletion-mode transistor.

ADDITIONAL NOTES AND EXAMPLES

In Example 1, a system can include a master device, a slave device coupled to the master device via an audio jack connector, wherein the master device and the slave device are configured to exchange information via a single conductive path of the audio jack connector using a digital communication protocol, wherein the single conductive path is configured to conduct audio signals of an audio transducer, and wherein the slave device includes a depletion-mode transistor configured to complete a circuit including the audio transducer and the single conductive path in a first state, and to isolate the audio transducer from the single conductive path in a second state.

In Example 2, the audio transducer of Example 1 optionally includes a microphone, and the single conductive path of Example 1 optionally is configured to conduct audio signals provided by the microphone.

In Example 3, the master device of any one or more of Examples 1-2 optionally includes a microphone transistor having a first state and a second state, the microphone transistor configured couple an audio input of the master device with the single conductive path in the first state and to isolate the audio input of the master device from the single conductive path in the second state.

In Example 4, the master device of any one or more of Examples 1-3 optionally includes a bias source, a bias resistor configured to provide a bias voltage to the single conductive path using the bias source, and a bypass transistor having a bypass state, the bypass transistor configured to bypass the bias resistor in the bypass state and to couple the bias source directly to the single conductive path in the bypass state.

In Example 5, the master device of any one or more of Examples 1-4 optionally includes a controller coupled to the control gate of the bypass transistor and the control gate of the microphone transistor.

In Example 6, the master device of any one or more of Examples 1-5 optionally includes first multi-master, multi-slave, single-ended, serial computer bus interface, wherein the slave device of any one or more of Examples 1-5 optionally includes a second multi-master, multi-slave, single-ended, serial computer bus, and wherein the single conductor of any one or more of Examples 1-5 optionally is configured to bridge information exchanged between the first multi-master, multi-slave, single-ended, serial computer bus interface and the second multi-master, multi-slave, single-ended, serial computer bus interface.

In Example 7, a master device can include a mate-able portion of an audio jack connector, a single conductive path coupled to a terminal of the mate-able portion, the single conductive path configured to receive audio signals from a slave device connected to the mate-able portion, to pass the audio signals to an audio processor of the master device, and to exchange digital communication information with the slave device, a bias source, a bias resistor coupled between an output of the bias source and the single conductive path and configure to provide a bias to a microphone of a slave device, and a bypass transistor having a bypass state, the bias transistor coupled parallel to the bias resistor and configured to couple the output of the bias source directly to the single conductive path in the bypass state.

In Example 8, the master device of any one or more of Examples 1-7 optionally includes a microphone transistor coupled to the single conductive path and the audio processor, the microphone transistor configured to couple the single conductive path to the audio processor in a first state and to isolate the single conductive path from the audio processor in a second state.

In Example 9, the master device of any one or more of Examples 1-8 optionally includes a first multi-master, multi-slave, single-ended, serial computer bus interface configured to exchange information with a second multi-master, multi-slave, single-ended, serial computer bus interface of a slave device connected to the mate-able portion using the single conductive path.

In Example 10, the master device of any one or more of Examples 1-2 optionally includes a microphone transistor coupled to the single conductive path and the audio processor, the microphone transistor configured to couple the single conductive path to the audio processor in a first state and to isolate the single conductive path from the audio processor in a second state and a first multi-master, multi-slave, single-ended, serial computer bus interface configured to exchange information with a second multi-master, multi-slave, single-ended, serial computer bus interface of a slave device connected to the mate-able portion using the single conductive path.

In Example 11, the master device of any one or more of Examples 1-10 optionally includes a controller configured to detect connection of a slave device coupled to the mate-able portion, wherein the controller is configured to de-bounce the connection of the slave device to prevent false connection indications.

In Example 12, the master device of any one or more of Examples 1-11 optionally includes a controller configured to detect connection of a slave device coupled to the mate-able portion, wherein the controller is configured to modulate the control node of at least one of the microphone transistor or the bypass transistor to eliminate audio pop from audio signal received at the audio processor.

In Example 13, a slave device configured to extend functionality of a master device can include a mate-able portion of an audio jack connector, a single conductive path coupled to a terminal of the mate-able portion, the single conductive path configured to conduct audio signals between an audio transducer of the slave device and a master device coupled to the mate-able portion and to exchange digital communication information with the master device, a depletion-mode transistor having a first state and a second state, the depletion-mode transistor configured to couple the audio transducer with the single conductive path in a first state and to isolate the audio transducer from the single conductive path in the second state, and wherein the first state can include an unpowered state of the slave device.

In Example 14, the audio transducer of any one or more of Examples 1-13 optionally includes an analog microphone.

In Example 15, the slave device of any one or more of Examples 1-14 optionally includes a first multi-master, multi-slave, single-ended, serial computer bus interface configured to exchange information with a second multi-master, multi-slave, single-ended, serial computer bus interface of a master device connected to the mate-able portion using the single conductive path.

In Example 16, a method of digital communication between a master device and a slave device can include detecting a voltage on microphone conductor rising above a first threshold, the voltage indicating the slave device is capable of and is ready for digital communication using the microphone conductor, transmitting a first code to the slave device using the microphone conductor and a first digital serial communication signal, receiving an second code from the slave device using the microphone conductor and a second digital communication signal, transmitting a third code to the slave device using the microphone conductor and a third digital serial communication signal, and disabling a bypass transistor of the master device to allow a bias resistor to apply a bias voltage to the microphone conductor.

In Example 17, the method of any one or more of Examples 1-16 optionally includes detecting a coupling of the slave device to the master device using a detection circuit of the master device.

In Example 18, the detecting the coupling of any one or more of Examples 1-17 optionally includes disabling a microphone transistor of the master device to isolate the microphone conductor from an audio processor.

In Example 19, the disabling a bypass transistor of any one or more of Examples 1-2 optionally includes enabling the microphone transistor of the master device to couple the microphone conductor to the audio processor.

In Example 20, the first code of any one or more of Examples 1-19 optionally includes a verification request, the second code includes identification information and the third code includes a power down code.

In Example 21, the first code of any one or more of Examples 1-19 optionally includes a verification code, the second code includes key-press information code and the third code includes a power down code.

In Example 22, the first code of any one or more of Examples 1-19 optionally includes a write code, the second code includes acknowledgment and the third code includes a write information.

In Example 23, a method of digital communication between a master device and a slave device can include detecting voltage on a microphone conductor rising above a first threshold at the slave device, the voltage indicating the master device is capable of and is ready for digital communication using the microphone conductor, isolating a microphone of the slave device from the microphone conductor using a depletion-mode transistor of the slave device, receiving a first code at the slave device using the microphone conductor and a first digital serial communication signal, transmitting an second code from the slave device using the microphone conductor and a second digital communication signal, receiving a third code at the slave device using the microphone conductor and a third digital serial communication signal, and coupling the microphone to the microphone conductor using the depletion-mode transistor.

In Example 24, the first code of any one or more of Examples 1-23 optionally includes a verification request, the second code includes identification information and the third code includes a power down code.

In Example 25, the first code of any one or more of Examples 1-23 optionally includes a verification code, the second code includes key-press information code and the third code includes a power down code.

In Example 26, the first code of any one or more of Examples 1-23 optionally includes a write code, the second code includes acknowledgment and the third code includes write information.

Example 27 can include, or can optionally be combined with any portion or combination of any portions of any one or more of Examples 1 through 26 to include, subject matter that can include means for performing any one or more of the functions of Examples 1 through 26, or a machine-readable medium including instructions that, when performed by a machine, cause the machine to perform any one or more of the functions of Examples 1 through 26.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system comprising:
a master device;
a slave device coupled to the master device via an audio jack connector;
wherein the master device and the slave device are configured to exchange information via a single conductive path of the audio jack connector using a digital communication protocol;
wherein the single conductive path is configured to conduct audio signals of an audio transducer; and
wherein the slave device includes a depletion-mode transistor configured to complete a circuit including the audio transducer and the single conductive path in a first, unpowered, default state, and to isolate the audio transducer from the single conductive path in a second state.

2. The system of claim 1, wherein the audio transducer includes a microphone; and
wherein the single conductive path is configured to conduct audio signals provided by the microphone.

3. The system of claim 1; wherein the master device includes a microphone transistor having a first state and a second state, the microphone transistor configured couple an audio input of the master device with the single conductive path in the first state and to isolate the audio input of the master device from the single conductive path in the second state.

4. The system of claim 1, wherein the master device includes:
a bias source;
a bias resistor configured to provide a bias voltage to the single conductive path using the bias source;
a bypass transistor having a bypass state, the bypass transistor configured to bypass the bias resistor in the bypass state and to couple the bias source directly to the single conductive path in the bypass state.

5. The system of claim 1, wherein the master device includes a controller coupled to the control gate of the bypass transistor and the control gate of the microphone transistor.

6. The system of claim 1, wherein the master device includes first multi-master, multi-slave, single-ended; serial computer bus interface;
wherein the slave device includes a second multi-master, multi-slave, single-ended, serial computer bus; and
wherein the single conductor is configured to bridge information exchanged between the first multi-master, multi-slave, single-ended, serial computer bus interface and the second multi-master, multi-slave, single-ended, serial computer bus interface.

7. A method of digital communication between a master device and a slave device, the method comprising:
detecting voltage on a microphone conductor rising above a first threshold at the slave device, the voltage indicating the master device is capable of and is ready for digital communication using the microphone conductor;
isolating a microphone of the slave device from the microphone conductor using a depletion-mode transistor of the slave device;
receiving a first code at the slave device using the microphone conductor and a first digital serial communication signal;
transmitting an second code from the slave device using the microphone conductor and a second digital communication signal;
receiving a third code at the slave device using the microphone conductor and a third digital serial communication signal; and
coupling the microphone to the microphone conductor using the depletion-mode transistor.

8. The method of claim 7, wherein the first code includes a verification request, the second code includes identification information and the third code includes a power down code.

9. The method of claim 7, wherein the first code includes a verification code, the second code includes key-press information code and the third code includes a power down code.

10. The method of claim 7, wherein the first code includes a write code, the second code includes acknowledgment and the third code includes write information.

11. The method of claim 7, including receiving power via the microphone conductor from the master device at a regulator of the slave device.

12. The method claim 11, including storing energy on a capacitor of the slave device using the regulator and the received power.

13. The method of claim 12, wherein isolating the microphone of the slave device from the microphone conductor includes switching a state of the depletion mode transistor using the energy stored on the capacitor.

14. A slave device configured to extend functionality of a master device, the slave device comprising:
- a mate-able portion of an audio jack connector;
- a single conductive path coupled to a terminal of the mate-able portion, the single conductive path configured to conduct audio signals between an audio transducer of the slave device and a master device coupled to the mate-able portion and to exchange digital communication information with the master device;
- a depletion-mode transistor having a first state and a second state, the depletion-mode transistor configured to couple the audio transducer with the single conductive path in a first state and to isolate the audio transducer from the single conductive path in the second state; and
- wherein the first state can include an unpowered state of the slave device.

15. The slave device of claim 14, wherein the audio transducer includes an analog microphone.

16. The slave device of claim 14, including a first multi-master, multi-slave, single-ended, serial computer bus interface configured to exchange information with a second multi-master, multi-slave, single-ended, serial computer bus interface of a master device connected to the mate-able portion using the single conductive path.

17. The slave device of claim 14, including a voltage regulator, the voltage regulator configured to receive power from the master device using the single conductive path, and to supply power to control logic of the slave device.

* * * * *